(12) United States Patent
Liu

(10) Patent No.: US 12,367,848 B2
(45) Date of Patent: Jul. 22, 2025

(54) DISPLAY PANEL COMPRISING CROSSTALK SUPPRESSION CIRCUIT AND DISPLAY DEVICE

(71) Applicant: Shenzhen China Star Optoelectronics Semiconductor Display Technology Co., Ltd., Shenzhen (CN)

(72) Inventor: Fangyun Liu, Shenzhen (CN)

(73) Assignee: SHENZHEN CHINA STAR OPTOELECTRONICS SEMICONDUCTOR DISPLAY TECHNOLOGY CO., LTD., Fangyun Liu (CN)

( * ) Notice: Subject to any disclaimer, the term of this patent is extended or adjusted under 35 U.S.C. 154(b) by 0 days.

(21) Appl. No.: 17/769,747

(22) PCT Filed: Mar. 14, 2022

(86) PCT No.: PCT/CN2022/080683
§ 371 (c)(1),
(2) Date: Apr. 17, 2022

(87) PCT Pub. No.: WO2023/164972
PCT Pub. Date: Sep. 7, 2023

(65) Prior Publication Data
US 2024/0412708 A1    Dec. 12, 2024

(30) Foreign Application Priority Data
Mar. 1, 2022    (CN) .......................... 202210192864.2

(51) Int. Cl.
*G09G 3/36* (2006.01)
(52) U.S. Cl.
CPC ... *G09G 3/3696* (2013.01); *G09G 2320/0209* (2013.01)

(58) Field of Classification Search
CPC ...... G09G 3/36; G09G 3/3611; G09G 3/3614; G09G 3/3622; G09G 3/3625; G09G 3/364;
(Continued)

(56) References Cited

U.S. PATENT DOCUMENTS 5,831,605 A * 11/1998 Yasui .................... G09G 3/3655
345/204
6,677,925 B1 * 1/2004 Kawaguchi .......... G09G 3/3655
345/55
(Continued)

FOREIGN PATENT DOCUMENTS

CN          102214440 A     10/2011
CN          105070260 A     11/2015
(Continued)

*Primary Examiner* — Ke Xiao
*Assistant Examiner* — Nelson Lam
(74) *Attorney, Agent, or Firm* — Nathan & Associates Patent Agents Ltd.; Menachem Nathan

(57) ABSTRACT

The present application relates to a display panel and a display device, wherein a crosstalk suppression circuit in the display panel includes a crosstalk suppression main module between a differential amplification signal terminal and an output voltage terminal of a display power supply circuit. The crosstalk suppression main module includes a threshold determining module and a crosstalk suppression module. The threshold determining module is configured to control that the crosstalk suppression module performs suppression of crosstalk of the differential amplification signal terminal and the output voltage terminal according to a crosstalk critical voltage and a differential amplification signal of the display power supply circuit.

14 Claims, 4 Drawing Sheets

(58) Field of Classification Search
CPC .. G09G 3/3644; G09G 3/3648; G09G 3/3655; G09G 3/3666; G09G 3/3674; G09G 3/3677; G09G 3/3681; G09G 3/3685; G09G 3/3688; G09G 3/3692; G09G 3/3696
USPC .................................................. 345/87–104
See application file for complete search history.

(56) References Cited

U.S. PATENT DOCUMENTS

| | | | | |
|---|---|---|---|---|
| 8,773,418 | B2 * | 7/2014 | Hsieh | G09G 3/20 345/94 |
| 2003/0103026 | A1 * | 6/2003 | Yamakawa | G09G 3/3629 345/87 |
| 2006/0244704 | A1 * | 11/2006 | JaeHun | G09G 3/3655 345/92 |
| 2007/0085800 | A1 * | 4/2007 | Lee | G09G 3/3655 345/94 |
| 2011/0090199 | A1 * | 4/2011 | Hsieh | G09G 3/20 345/211 |
| 2012/0262230 | A1 * | 10/2012 | Llewellyn | H03F 3/187 330/124 R |
| 2013/0249880 | A1 * | 9/2013 | Chen | G09G 3/3614 345/87 |
| 2016/0334658 | A1 * | 11/2016 | Jo | G09G 3/3655 |
| 2018/0286336 | A1 * | 10/2018 | Wang | G02F 1/1343 |

FOREIGN PATENT DOCUMENTS

| | | |
|---|---|---|
| CN | 105741797 A | 7/2016 |
| CN | 108847173 A | 11/2018 |
| CN | 109377960 A | 2/2019 |
| CN | 208707519 U | 4/2019 |
| EP | 3125229 A1 | 2/2017 |
| JP | 2012145848 A | 8/2012 |
| WO | 2013143157 A1 | 10/2013 |

* cited by examiner

DISPLAY PANEL COMPRISING CROSSTALK SUPPRESSION CIRCUIT AND DISPLAY DEVICE

TECHNICAL FIELD

The present application relates to display technology, and in particular, to a display panel and a display device.

BACKGROUND

Liquid crystal displays (LCDs) are currently dominant display devices. During working procedure of the LCD, a corresponding power supply is required for working assistance.

FIG. 1 is a circuit diagram of a LCD power supply. As shown in FIG. 1, a Vout voltage is input to a LCD common electrode, and a capacitive coupling effect of data lines may affect a voltage of the common electrode. If the common electrode potential cannot be recovered to a set voltage in a short time, crosstalk may occur. In order to solve the crosstalk problem, a conventional solution employed includes using a differential amplification design and adjusting parameters of resistors R1 and R2 to recover the Vout voltage to the set voltage, thereby improving the crosstalk problem, as shown in FIG. 1.

Technical Problems

However, taking FIG. 1 for example, a peripheral load of the LCD is relatively light when being operated in a low grayscale state, and a power supply IC is operated under a discontinuous conduction mode (DCM). At this time, a current is intermittent, a parasitic capacitance generates oscillations, and an output ripple is increased. AC fluctuation of CFVCOM causes the increase of that of voltage Vout, and in turn the fluctuation of voltage Vout causes a fluctuation of liquid crystal charging voltage, thereby resulting in crosstalk. A solution to the crosstalk is to add a feedback circuit to make the output voltage Vout relatively stable, but its AC ripple cannot be significantly reduced, thus not significantly improving the crosstalk.

As can be seen, in the conventional LCD power supply circuit, it is difficult to effectively suppress the crosstalk problem of circuits.

Technical Solutions

In view of this, it is necessary to provide a display panel and a display device for settling a crosstalk matter in response to the above technical requirements.

A display panel includes an array substrate and a display control circuit connected to the array substrate.

A crosstalk suppression circuit and a display power supply circuit are disposed in the display control circuit.

The crosstalk suppression circuit comprises the following:

a crosstalk suppression main module between a differential amplification signal terminal and an output voltage terminal of the display power supply circuit. The differential amplification signal terminal is an output terminal of a differential amplifier of the display power supply circuit, and the output voltage terminal is an electrical interface of the display power supply circuit.

The crosstalk suppression main module comprises a threshold determining module and a crosstalk suppression module.

The threshold determining module is configured to control that the crosstalk suppression module perform the suppression of crosstalk of the differential amplification signal terminal and the output voltage terminal, according to a crosstalk critical voltage and a differential amplification signal of the display power supply circuit.

A display device comprises a display panel.

The display panel comprises an array substrate and a display control circuit connected the array substrate.

A crosstalk suppression circuit and a display power supply circuit are disposed in the display control circuit.

The crosstalk suppression circuit comprises the following:

a crosstalk suppression main module between a differential amplification signal terminal and an output voltage terminal of the display power supply circuit. The differential amplification signal terminal is an output terminal of a differential amplifier of the display power supply circuit, and the output voltage terminal is an electrical interface of the display power supply circuit.

The crosstalk suppression main module comprises a threshold determining module and a crosstalk suppression module.

The threshold determining module is configured to control that the crosstalk suppression module performs the suppression of crosstalk of the differential amplification signal terminal and the output voltage terminal according to a crosstalk critical voltage and a differential amplification signal of the display power supply circuit.

Beneficial Effects

The above display panel comprises an array substrate and a display control circuit, and a crosstalk suppression circuit and a display power supply circuit are disposed in the display control circuit. The crosstalk suppression circuit comprises a crosstalk suppression main module between a differential amplification signal terminal and an output voltage terminal of the display power supply circuit. The differential amplification signal terminal is an output terminal of a differential amplifier of the display power supply circuit, and the output voltage terminal is an electrical interface of the display power supply circuit. The crosstalk suppression main module comprises a threshold determining module and a crosstalk suppression module. The threshold determining module is configured to control that the crosstalk suppression module performs the suppression of crosstalk of the differential amplification signal terminal and the output voltage terminal according to a crosstalk critical voltage and a differential amplification signal of the display power supply circuit. Based on the above, by determining the crosstalk of the display power supply circuit in a low grayscale state based on the differential amplification signal and the crosstalk critical voltage, the AC output ripple of the output voltage is reduced, and accurate suppression for crosstalk is performed.

DESCRIPTION OF THE DRAWINGS

In order to more clearly explain the technical solutions in the embodiments of the present application or in the prior art, the following will briefly explain the drawings that need to be used in the description of the embodiments or prior art. Obviously, the drawings in the following description are only some embodiments of the present application. For those skilled in the art, without paying any creative work, other drawings can be obtained based on these drawings.

EMBODIMENTS OF THE PRESENT INVENTION

Figure 1:
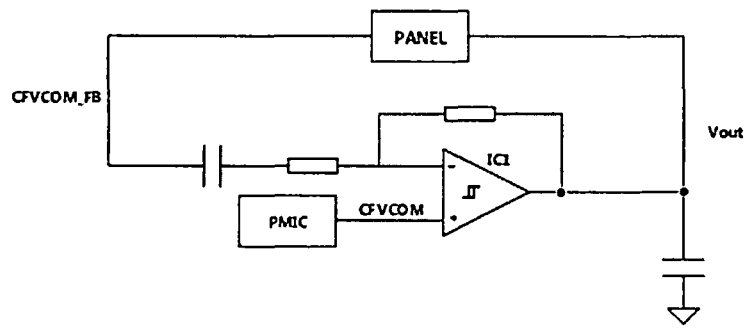
FIG. 1 is a diagram of a display power supply circuit.

In order to facilitate understanding of the present application, the present application will be described in detail below with reference to the accompanying drawings. Preferred embodiments of the present application are shown in the drawings. The present application may be implemented in many different forms and is not limited to the embodiments described herein. These embodiments are provided only for the purpose of making the disclosure of the present application more thorough and complete.

It should be noted that when one element is considered to "connect to" another element, it may be directly connected to another element and integrated therewith, or there are one or more intervening element present therebetween. The terms "installation", "end", "another end" and similar expressions are used herein for illustrative purposes only.

Unless otherwise defined, all technical and scientific terms used herein have same meanings as those generally understood by those skilled in the art to which the present application pertains. The terms used herein in the specification of the present application are for the purpose of describing specific embodiments only and are not intended to limit the present application. The term "and/or" as used herein includes any and all combinations of one or more related listed items.

Embodiments of the present invention provide a display panel.

The display panel comprises an array substrate and a display control circuit connected to the array substrate, and a crosstalk suppression module and a display power supply circuit are disposed in the display control circuit.

Figure 2:
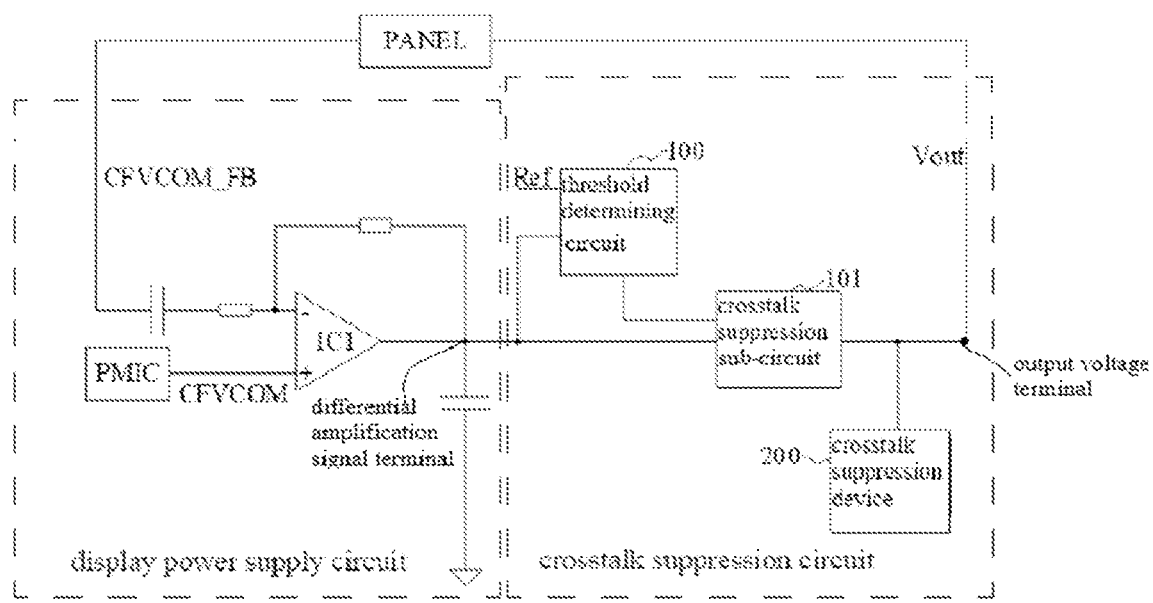
FIG. 2 is a block diagram of a crosstalk suppression circuit according to an embodiment.

FIG. 2 is a block diagram of a crosstalk suppression circuit according to an embodiment. As shown in FIG. 2, the crosstalk suppression circuit according to an embodiment comprises the following:

a crosstalk suppression main module between a differential amplification signal terminal and an output voltage terminal of the display power supply circuit, wherein the differential amplification signal terminal is an output terminal of a differential amplifier of the display power supply circuit, and the output voltage terminal is an electrical interface of the display power supply circuit.

The crosstalk suppression main module comprises a threshold determining module 100 and a crosstalk suppression module 101.

The threshold determining module 100 is configured to control that the crosstalk suppression module 101 performs the suppression of crosstalk of the differential amplification signal terminal and the output voltage terminal, according to a crosstalk critical voltage Ref and a differential amplification signal of the display power supply circuit.

In one embodiment, the threshold determining module 100 is configured to compare the differential amplification signal of the display power supply circuit with the crosstalk critical voltage Ref. A first signal is output when the differential amplification signal is less than the crosstalk critical voltage Ref, and a second signal is output when the differential amplification signal is greater than the crosstalk critical voltage Ref.

The crosstalk critical voltage Ref may be an output reference voltage of the display power supply circuit, or a voltage reference value preset for the threshold determining module 100.

In one embodiment, the crosstalk suppression module 101 is configured to turn on an electric connection between the differential amplification signal terminal and the output voltage Vout side according to the second signal.

In one embodiment, as shown in FIG. 1, the crosstalk suppression module 101 comprises a crosstalk suppression device 200 connected in the path.

Compared with the conventional display power supply circuit of FIG. 1, the crosstalk critical voltage Ref is captured on the basis of the differential amplification signal output from an operational amplifier IC1, as shown in FIG. 2. The crosstalk critical voltage Ref may be acquired by performing voltage sampling in the load of the display power supply circuit. The crosstalk critical voltage Ref may also be preset according to an empirical value of crosstalk generation, and is output to the threshold determining module 100 in a form of preset voltage. Based on the above, in one embodiment, the magnitude of the crosstalk critical voltage Ref may be determined depending on the type of load or operating properties of the display power supply circuit.

Based on the above, in one embodiment, the electrical interface of the display power supply circuit includes a PANEL terminal, a power supply interface, or a reference voltage interface. As a preferred embodiment, the PANEL terminal may be selected as the electrical interface, as shown in FIG. 2.

Based on the above, the threshold determining module 100 outputs the first signal or the second signal according to the comparison of the magnitude of the differential amplification signal and the crosstalk critical voltage Ref. The differential amplification signal is less than the crosstalk critical voltage Ref, indicating that the display power supply circuit and the load are normal and no obvious crosstalk occurs (meeting a suppression requirement), and the differential amplification signal is greater than the crosstalk critical voltage Ref, indicating that significant crosstalk is present in the display power supply circuit and the load and should be suppressed accordingly.

In one embodiment, the threshold determining module 100 comprises a comparison circuit, one input end of the comparison circuit is used for receiving the differential amplification signal, and another input end of the comparison circuit is used for receiving the crosstalk critical voltage Ref, and an output end is used for outputting the first or second signal.

Figure 3:
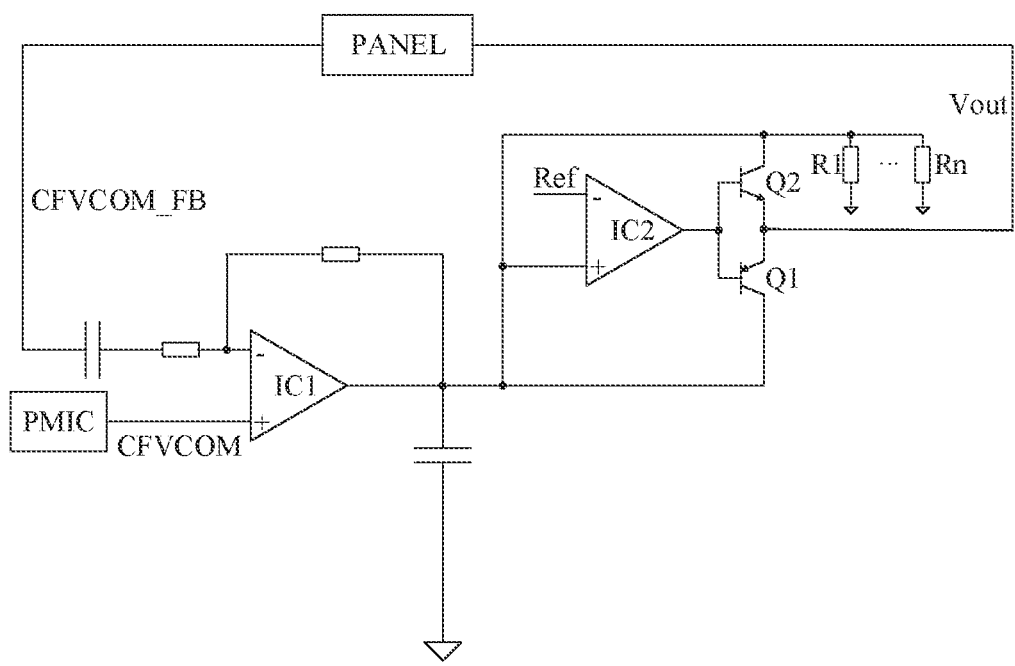
FIG. 3 is a diagram of a crosstalk suppression circuit according to an embodiment.

FIG. 3 is a crosstalk suppression circuit diagram according to an embodiment. As shown in FIG. 3, the threshold determining module 100 constructs a comparison circuit based on an operational amplifier IC2, and outputs a first signal or a second signal.

An integrated comparator chip may be selected as the threshold determining module 100 to accordingly compare the magnitude of a differential amplification signal and a crosstalk critical voltage Ref.

Figure 4:
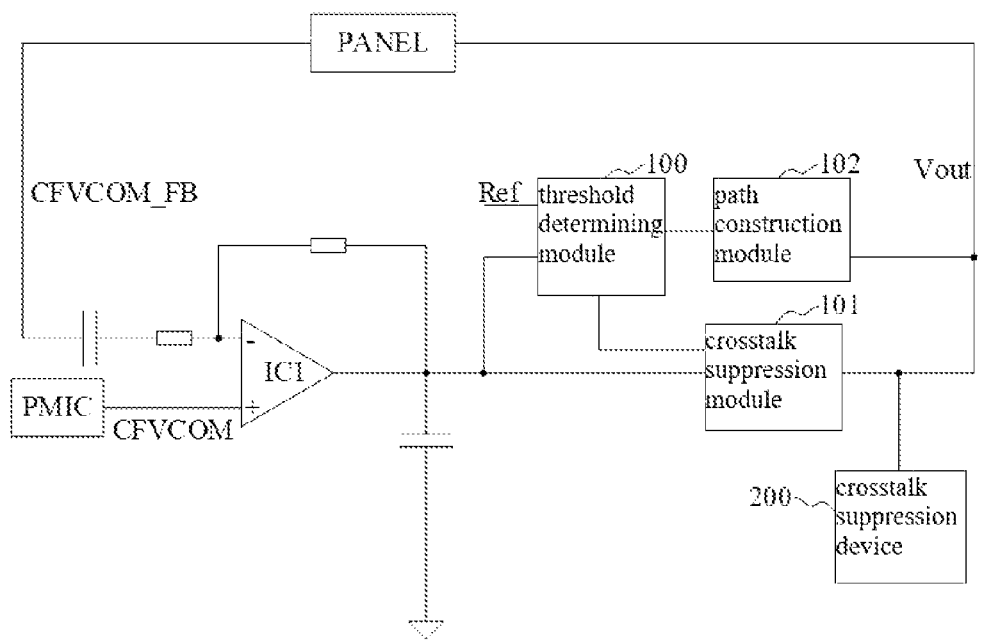
FIG. 4 is a block diagram of a crosstalk suppression circuit according to another embodiment.

In one embodiment, FIG. 4 is a block diagram of a crosstalk suppression circuit according to another embodiment. As shown in FIG. 4, the crosstalk suppression circuit according to another embodiment further comprises a path construction module 102 for turning on or off an electric connection between the differential amplification signal terminal and the output voltage terminal.

The path construction module 102 turns on or off the electric connection between the differential amplification signal terminal and the output voltage terminal to provide another path for the differential amplification signal terminal and the output voltage terminal. When the crosstalk suppression module 101 turns off the electric connection between the differential amplification signal terminal and the output voltage terminal, a backup path is provided.

In one embodiment, the path construction module 102 performs corresponding connection or disconnection of the path based on the output of the first or second signal. When the threshold determining module 100 outputs the first signal, it indicates that the display power supply circuit and the load are normal, and the path construction module 102 constructs a path between the differential amplification signal terminal and the output voltage Vout side to perform normal output of the output voltage Vout.

When the threshold determining module 100 outputs the second signal, the path construction module 102 turns off the path constructed through itself, and the crosstalk suppression module 101 performs path construction between the differential amplification signal terminal and the output voltage Vout side.

Meanwhile, during path construction by the crosstalk suppression module 101, the crosstalk suppression device 200 is connected to suppress crosstalk. Unlike crosstalk suppression by arranging a feedback circuit, the crosstalk suppression device 200 can perform effective AC ripple suppression due to direct connection into the path, thereby reducing crosstalk of the circuit.

In one embodiment, the path construction module 102 comprises a first controlled switch.

One switch terminal of the first controlled switch is configured to connect the differential amplification signal terminal, another switch terminal of the first controlled switch is configured to connect the output voltage Vout side, and a controlled terminal of the first controlled switch is configured to receive a first signal or a second signal.

In a form of the first controlled switch, the connection and disconnection of the path by the path construction module 102 is achieved by turning on or off of switches.

In one embodiment, the first controlled switch includes a semiconductor switching device, a relay, or an electronic switching chip.

The semiconductor switching device includes a field effect transistor, a transistor, a silicon controlled rectifier, and the like. For example, a gate of the field effect transistor is used as a controlled terminal to implement switching logic. Similarly, contact control of the relay may implement switching logic of the first controlled switch.

In one embodiment, as shown in FIG. 3, the first controlled switch includes a PNP transistor Q1.

A base of the PNP transistor Q1 is configured to receive a first signal or a second signal, an emitting electrode of the base of the PNP transistor Q1 is configured to connect the output voltage Vout side, and an emitting electrode of a collector of the PNP transistor Q1 is configured to connect the differential amplification signal terminal.

As shown in FIG. 3, the first signal is a logical low level signal to drive the PNP transistor Q1 to be turned on and construct a path between the differential amplification signal terminal and the output voltage Vout side. The second signal is a logical high level signal, while the PNP transistor Q1 is turned off, and the path between the differential amplification signal terminal and the output voltage Vout side is also turned off.

Similarly, the crosstalk suppression module 101 comprises a second controlled switch.

One switch terminal of the second controlled switch is configured to connect the differential amplification signal terminal, another switch terminal of the second controlled switch is configured to connect the output voltage Vout side, and a controlled terminal of the second controlled switch is configured to connect a first signal or a second signal.

One end of the crosstalk suppression device 200 is connected to ground, and the other end is connected to one or another switch terminal of the second controlled switch.

In the form of the second controlled switch, the connection or disconnection of the path by the crosstalk suppression module 101 is achieved by turning on or off of the switch.

In one embodiment, the second controlled switch includes a semiconductor switching device, a relay, and an electronic switching chip.

The semiconductor switching device includes a field effect transistor, a transistor, a silicon controlled rectifier, and the like. For example, a gate of the field effect transistor is used as a controlled terminal to implement switching logic. Similarly, contact control of the relay may implement the switching logic of the second controlled switch.

In one embodiment, as shown in FIG. 3, the second controlled switch includes an NPN transistor Q2.

A base of the NPN transistor Q2 is configured to receive a first signal or a second signal, an emitting electrode of the base of the NPN transistor Q2 is configured to connect the output voltage Vout side, and an emitting electrode of a collector of the NPN transistor Q2 is configured to connect the differential amplification signal terminal.

As shown in FIG. 3, the second signal is a logical high level signal to drive the NPN transistor Q2 to be turned on and construct a path between the differential amplification signal terminal and the output voltage Vout side. The first signal is a logical low level signal, the NPN transistor Q2 is turned off, and the path between the differential amplification signal terminal and the output voltage Vout side is also turned off.

It should be noted that the selection of device type of the NPN transistor Q2 and the PNP transistor Q1 is related to the logical level setting of the first signal and the second signal. On the basis of meeting the requirements of crosstalk detection, the selection of device type of the NPN transistor Q2 and the PNP transistor Q1 may be adjusted according to the logic setting difference of the first signal and the second signal, and the above selection does not mean it is the only option.

The crosstalk suppression device 200 is configured to suppress AC ripple in the circuit, and comprises an AC suppression element, such as an inductance element, connected in series in the path between the differential amplification signal terminal and the output voltage Vout side.

In one embodiment, as shown in FIG. 3, the crosstalk suppression device 200 comprises one or more resistors (R1-Rn) in parallel, one end of which is connected to a path formed by the crosstalk suppression module 101 and the other end is for grounding.

The number of resistances (n) in parallel in the crosstalk suppression device 200 can be determined according to the type of load or operating properties of the display power supply circuit, and adjusted by the empirical value accordingly.

The above display panel comprises an array substrate and a display control circuit, and a crosstalk suppression circuit and a display power supply circuit are disposed in the display control circuit. The crosstalk suppression circuit comprises a crosstalk suppression main module between a differential amplification signal terminal and an output voltage terminal of the display power supply circuit. The differential amplification signal terminal is an output terminal of a differential amplifier of the display power supply circuit, and the output voltage terminal is an electrical interface of the display power supply circuit. The crosstalk suppression main module comprises a threshold determining module and a crosstalk suppression module. The threshold determining module is configured to control that the crosstalk suppression module performs suppression of crosstalk of the differential amplification signal terminal and the output voltage terminal according to a crosstalk critical voltage and a differential amplification signal of the display power supply circuit. Based on the above, the crosstalk of the display power supply circuit in a low grayscale state is determined based on the differential amplification signal and the crosstalk critical voltage, the AC output ripple of the output voltage is reduced, and accurate suppression for crosstalk is performed.

Embodiments of the present invention also provide a display device.

A display device comprises the display panel of any of the embodiments described above.

The display device may be an equipment having a display screen, such as a computer display, a television, a smartphone, or a smart watch. The display device achieves crosstalk suppression based on the display panel described above, thereby effectively improving display quality of the display device.

The above-mentioned display device comprises a display panel. The display panel comprises an array substrate and a display control circuit, and a crosstalk suppression circuit and a display power supply circuit are disposed in the display control circuit. The crosstalk suppression circuit comprises a crosstalk suppression main module between a differential amplification signal terminal and an output voltage terminal of the display power supply circuit. The differential amplification signal terminal is an output terminal of a differential amplifier of the display power supply circuit, and the output voltage terminal is an electrical interface of the display power supply circuit. The crosstalk suppression main module comprises a threshold determining module and a crosstalk suppression module. The threshold determining module is configured to control that the crosstalk suppression module performs suppression of crosstalk of the differential amplification signal terminal and the output voltage terminal according to a crosstalk critical voltage and a differential amplification signal of the display power supply circuit. Based on the above, the crosstalk of the display power supply circuit in a low grayscale state is determined based on the differential amplification signal and the crosstalk critical voltage, the AC output ripple of the output voltage is reduced, and accurate suppression for crosstalk is performed.

The technical features of the above embodiments may be arbitrarily combined, and for the sake of brevity, all possible combinations of the technical features of the above embodiments are not described. However, as long as the combination of these technical features is not contradictory, it should be considered as falling in the scope described in the present specification.

The above embodiments express only several embodiments of the present application, the description of which is specific and detailed, but is not to be construed as limiting the scope of the present application. It should be noted that, for those of ordinary skill in the art, several variations and improvements may be made without departing from the concepts of the present application, which are within the scope of the present application. Accordingly, the scope of the present patent application is defined by the appended claims.

What is claimed is:

1. A display panel, comprising a display control circuit, wherein the display control circuit comprises a crosstalk suppression circuit and a display power supply circuit, wherein the crosstalk suppression circuit comprises:
a threshold determining circuit and a crosstalk suppression sub-circuit disposed between a differential amplification signal terminal of the display power supply circuit and an output voltage terminal, wherein the differential amplification signal terminal is an output terminal of a differential amplifier of the display power supply circuit, and the output voltage terminal is connected to the display power supply circuit;
the threshold determining circuit is configured to compare a crosstalk critical voltage with a differential amplification signal of the display power supply circuit, and output a first signal when the differential amplification signal is less than the crosstalk critical voltage, or output a second signal when the differential amplification signal is greater than the crosstalk critical voltage,
wherein the first signal is used to stop crosstalk suppression by the crosstalk suppression sub-circuit, and the second signal is used to start crosstalk suppression by the crosstalk suppression sub-circuit.

2. The display panel according to claim 1, further comprising:
a path construction circuit configured to turn on an electric connection between the differential amplification signal terminal and the output voltage terminal according to the first signal, or turn off the electric connection between the differential amplification signal terminal and the output voltage terminal according to the second signal.

3. The display panel according to claim 2, wherein the path construction circuit comprises a first controlled switch,
wherein one switch terminal of the first controlled switch is configured to connect the differential amplification signal terminal, another switch terminal of the first controlled switch is configured to connect the output voltage terminal, and a controlled terminal of the first controlled switch is configured to receive the first signal or the second signal,
wherein the one switch terminal and the another switch terminal are turned on when the controlled terminal of the first controlled switch receives the first signal, and the one switch terminal and the another switch terminal are turned off when the controlled terminal of the first controlled switch receives the second signal.

4. The display panel according to claim 1, wherein the crosstalk suppression sub-circuit is configured to turn on an electric connection between the differential amplification signal terminal and the output voltage terminal according to the second signal, and
wherein the crosstalk suppression circuit comprises a crosstalk suppression device connected into a path.

5. The display panel according to claim 2, wherein the crosstalk suppression sub-circuit comprises a second controlled switch,
wherein one switch terminal of the second controlled switch is configured to connect the differential amplification signal terminal, another switch terminal of the second controlled switch is configured to connect the output voltage terminal, and a controlled terminal of the second controlled switch is configured to receive the first signal or the second signal,
wherein the one switch terminal and the another switch terminal are turned off when the controlled terminal of the second controlled switch receives the first signal, and the one switch terminal and the another switch terminal are turned on when the controlled terminal of the second controlled switch receives the second signal,
wherein one end of the crosstalk suppression device is connected to ground, and another end of the crosstalk suppression device is connected to the one or the another switch terminal of the second controlled switch.

6. The display panel according to claim 4, wherein the crosstalk suppression device comprises:
one or more resistors connected in parallel, wherein one end of the one or more resistors connected in parallel is connected to a path formed by the crosstalk suppression sub-circuit, and another end of the one or more resistors connected in parallel is connected to ground.

7. The display panel according to claim 1, wherein the threshold determining circuit comprises a comparison circuit,
wherein one input of the comparison circuit is configured to receive the differential amplification signal, another input of the comparison circuit is configured to receive the crosstalk critical voltage, and an output of the comparison circuit is configured to output the first signal or the second signal.

8. A display device comprising a display panel,
wherein the display panel comprises a display control circuit,
the display control circuit comprises a crosstalk suppression circuit and a display power supply circuit,
wherein the crosstalk suppression circuit comprises:
a threshold determining circuit and a crosstalk suppression sub-circuit disposed between a differential amplification signal terminal of the display power supply circuit and an output voltage terminal; wherein the differential amplification signal terminal is an output terminal of a differential amplifier of the display power supply circuit, and the output voltage terminal is connected to the display power supply circuit,
the threshold determining circuit is configured to compare a crosstalk critical voltage with a differential amplification signal of the display power supply circuit, and output a first signal when the differential amplification signal is less than the crosstalk critical voltage, or output a second signal when the differential amplification signal is greater than the crosstalk critical voltage,
wherein the first signal is used to stop crosstalk suppression by the crosstalk suppression sub-circuit, and the second signal is used to start crosstalk suppression by the crosstalk suppression sub-circuit.

9. The display device according to claim 8, further comprising:
a path construction circuit configured to turn on an electric connection between the differential amplification signal terminal and the output voltage terminal according to the first signal, or turn off the electric connection between the differential amplification signal terminal and the output voltage terminal according to the second signal.

10. The display device according to claim 9, wherein the path construction circuit comprises a first controlled switch,
wherein one switch terminal of the first controlled switch is configured to connect the differential amplification signal terminal, another switch terminal of the first controlled switch is configured to connect the output voltage terminal, and a controlled terminal of the first controlled switch is configured to receive the first signal or the second signal,
wherein the one switch terminal and the another switch terminal are turned on when the controlled terminal of the first controlled switch receives the first signal, and the one switch terminal and the another switch terminal are turned off when the controlled terminal of the first controlled switch receives the second signal.

11. The display device according to claim 8, wherein the crosstalk suppression sub-circuit is configured to turn on an electric connection between the differential amplification signal terminal and the output voltage terminal according to the second signal, and
wherein the crosstalk suppression circuit comprises a crosstalk suppression device connected into a path.

12. The display device according to claim 11, wherein the crosstalk suppression sub-circuit comprises a second controlled switch,
wherein one switch terminal of the second controlled switch is configured to connect the differential amplification signal terminal, another switch terminal of the second controlled switch is configured to connect the output voltage terminal, and a controlled terminal of the second controlled switch is configured to receive the first signal or the second signal,
wherein the one switch terminal and the another switch terminal are turned off when the controlled terminal of the second controlled switch receives the first signal, and the one switch terminal and the another switch terminal are turned on when the controlled terminal of the second controlled switch receives the second signal,
wherein one end of the crosstalk suppression device is connected to ground, and another end of the crosstalk suppression device is connected to the one or the another switch terminal of the second controlled switch.

13. The display device according to claim 11, wherein the crosstalk suppression device comprises:
one or more resistors connected in parallel, wherein one end of the one or more resistors connected in parallel is connected to a path formed by the crosstalk suppression sub-circuit, and another end of the one or more resistors connected in parallel is connected to ground.

14. The display device according to claim 8, wherein the threshold determining circuit comprises a comparison circuit,
wherein one input of the comparison circuit is configured to receive the differential amplification signal, another input of the comparison circuit is configured to receive the crosstalk critical voltage, and an output of the comparison circuit is configured to output the first signal or the second signal.

* * * * *